(12) United States Patent
Turner

(10) Patent No.: US 7,269,162 B1
(45) Date of Patent: Sep. 11, 2007

(54) INTEGRATION OF PRESENCE SERVICES WITH A NETWORK ENABLED TELEPHONY DEVICE

(75) Inventor: Bryan C. Turner, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 792 days.

(21) Appl. No.: 09/908,578

(22) Filed: Jul. 20, 2001

(51) Int. Cl.
*H04L 12/66* (2006.01)
*H04L 12/28* (2006.01)
*G06F 15/16* (2006.01)

(52) U.S. Cl. ................... 370/352; 370/401; 709/227
(58) Field of Classification Search ........ 370/352–356, 370/401, 252, 465; 379/201.1; 709/217, 709/219, 225, 204, 206, 207, 215; 715/751–753
See application file for complete search history.

(56) References Cited

U.S. PATENT DOCUMENTS

| | | | | |
|---|---|---|---|---|
| 6,463,471 B1 * | 10/2002 | Dreke et al. | ................ | 709/224 |
| 6,501,740 B1 * | 12/2002 | Sun et al. | .................... | 370/261 |
| 6,618,369 B1 * | 9/2003 | Huh et al. | .................. | 370/352 |
| 6,678,719 B1 * | 1/2004 | Stimmel | ...................... | 709/204 |
| 6,700,967 B2 * | 3/2004 | Kleinoder et al. | ....... | 379/201.1 |
| 6,714,519 B2 * | 3/2004 | Luzzatti et al. | ............. | 370/252 |
| 6,747,970 B1 * | 6/2004 | Lamb et al. | ................ | 370/352 |
| 6,750,881 B1 * | 6/2004 | Appelman | .................. | 715/733 |
| 6,757,365 B1 * | 6/2004 | Bogard | ..................... | 379/88.17 |
| 6,757,372 B1 * | 6/2004 | Dunlap et al. | ......... | 379/142.17 |
| 6,785,379 B1 * | 8/2004 | Rogers et al. | ......... | 379/265.02 |
| 6,807,562 B1 * | 10/2004 | Pennock et al. | ............ | 709/204 |
| 6,829,231 B1 * | 12/2004 | Wilson | ....................... | 370/352 |
| 7,023,989 B1 | 4/2006 | Turner et al. | | |
| 2002/0075303 A1 * | 6/2002 | Thompson et al. | ......... | 345/751 |

OTHER PUBLICATIONS

Arango et al., "Media Gateway Control Protocol (MGCP) Version 1.0", Network Working Group, Request for Comments: 2705, Oct. 1999, pp. 1-134.
Handley et al., "SIP: Session Initiation Protocol", Network Working Group, Request for Comments: 2543, Mar. 1999, pp. 1-153.

* cited by examiner

Primary Examiner—Chau Nguyen
Assistant Examiner—Nittaya Juntima
(74) Attorney, Agent, or Firm—Leon R. Turkevich

(57) ABSTRACT

A network-enabled user interface device, for example a VoIP telephony device that serves as a Voice over IP endpoint, includes an executable presence resource configured for establishing and maintaining presence information for a user of the user interface device. The presence resource outputs the presence information to at least one selected destination, enabling other user interface devices on the network to detect the presence information for the user relative to the user interface device. The presence resource also is configured for retrieving presence information for other network subscribers, enabling the user interface device to select available services based on the retrieved presence information. Moreover, user interface device may present selected services or network subscriber data to the user based on the retrieved presence information, enabling the user to determine appropriate operation to perform based on the retrieved presence information.

56 Claims, 5 Drawing Sheets

| Device Status | User Name, etc. |
|---|---|
| Device Connection | User Activity Duration |
| Device Location | Device/User Idle Interval |
| Other User Devices | User Status Phrases |
| New Messages | |

INTEGRATION OF PRESENCE SERVICES WITH A NETWORK ENABLED TELEPHONY DEVICE

BACKGROUND OF THE INVENTION

1. Field of the Invention

The present invention relates to network enabled telephony devices, for example Voice over IP Telephones, configured for executing applications related to attributes of a telephony user.

2. Description of the Related Art

Telephony devices have advanced to provide enhanced features for business consumers. For example, a business premises deploying a Private Branch Exchange (PBX) for intraoffice or interoffice communications utilizes telephony devices capable of receiving messages from the PBX, including a time of day string or a calling party identity string. However, proprietary PBX systems limit the availability of features that can be added to the telephony device. In addition, proprietary PBX systems typically provide voice-only services, such that text, data, or images cannot be transferred to the telephony device.

Browser-based telephony device technology is being implemented in wireless telephones using Wireless Application Protocol (WAP). In particular, WAP uses Extensible Markup Language (XML) technology to communicate interface changes to wireless devices such as digital wireless telephones and pagers, enabling applications and services to be provided to the digital wireless telephones. The use of XML tags enables the data to be displayed on the digital wireless telephone display in a prescribed manner.

The WAP-based approach to displaying data on the digital wireless telephone still suffers from the disadvantage that the input and display controllers of the digital wireless telephone interact with a single WAP portal (i.e., server), limiting the flexibility of the telephony device operations. In particular, a user is unable to send or receive a wireless telephone call on his or her web-enabled digital wireless telephone while using the digital wireless telephone to access the Internet. This problem is particularly apparent in "Wireless Web" services offered by wireless service providers offering web-based services such as instant messaging: the instant messaging client resides in the WAP portal, hence the instant messaging service on the wireless telephone is separate and distinct from the wireless telephone operations. Hence, the wireless telephone user is unable to send or receive wireless telephone calls during use of the instant messaging client. Moreover, the distinct nature of the wireless telephony operations and the wireless web services limits the nature of enhanced services that can be provided to the user.

Presence detection systems typically are used to determine a location of a person using different detection means. Although the simplest form of presence detection may involve a user logging into a service, for example a user of a computer (or web-enabled wireless telephone) logging into an instant messaging service, proposed presence detection systems also may be utilized. For example, proposed presence detection systems are configured for determining the location of a person based on that person wearing an active badge; the proposed presence detection system, upon determining the location of the active badge, would identify a nearby telephone for routing an urgent call to the person. These presence detection systems, however, still are executed by a software resource separate from any user device; hence, the known presence detection systems are limited to identifying a location of a person, and do not provide any additional features (other than call routing) that would enable a user to enjoy enhanced services based on attributes associated with the detected presence.

Voice over IP (VoIP) technology has evolved to provide network enabled telephony devices, for example Voice over IP telephony devices, configured for performing multiple operations that emulate a telephony device. VoIP telephony devices often include large display screens or other display capabilities, enabling new service features to be provided for a user. For example, the VoIP telephones, such as the commercially-available Cisco Telecaster 7960 IP Telephone from Cisco Systems, San Jose, Calif., includes user input and display operations. These user input and display operations enable a user to access multiple windows displaying respective applications based on soft key or hard key inputs, such as accessing a central telephone directory for retrieval of an employee's telephone number using a search query or selection from the displayed list. A user of the VoIP telephone can access one window configured displaying call status (e.g., duration of call, called party identity), or access another window configured for displaying the central telephone directory.

The executable software resident in the VoIP telephone, however, tends to be device-specific. Hence, the executable software needs to be rewritten for newer VoIP telephones having different hardware configurations (e.g., different sets of hard buttons, color display vs. greyscale display, different-sized display, etc.). Moreover, the device-specific nature of the VoIP telephone software limits the manner in which different application services can be added to the VoIP telephone device for the device user: the VoIP telephone software needs to be modified to add the different application services.

In addition, the VoIP telephone typically is configured for communication with a single call server, resulting in additional resource requirements imposed on the call server as services are added. Hence, existing VoIP technology is limited in the available services due to the control of services by a remote server.

SUMMARY OF THE INVENTION

There is a need for an arrangement that enables users of network-enabled telephony devices to enjoy enhanced communications services based on integration of user-specific attributes, such as presence-based attributes, with device-based attributes and service attributes. Such enhanced communications services include dynamic call routing of a call by a network-enabled telephony device to destination telephony device serving a subscriber, based on determined presence information for the subscriber. Such enhanced communications services also include providing selected services related to a destination subscriber on a network-enabled telephony device, based on determined presence attributes for the destination subscriber and corresponding device attributes for the destination subscriber.

These and other needs are attained by the present invention, where a network-enabled user interface device, for example a VoIP telephony device that serves as a Voice over IP endpoint, includes an executable presence resource configured for establishing and maintaining presence information for a user of the user interface device. The presence resource outputs the presence information to at least one selected destination, enabling other user interface devices on the network to detect the presence information for the user relative to the user interface device. The presence resource also is configured for retrieving presence information for other network subscribers, enabling the user interface device to select available services based on the retrieved presence information. Moreover, user interface device may present selected services or network subscriber data to the user based on the retrieved presence information, enabling the user to determine appropriate operation to perform based on the retrieved presence information.

Hence, the presence resource executable within the network-enabled telephony device enables the integration of presence services with network-enabled services and device-specific attributes, to provide presence-based communications services.

One aspect of the present invention provides a network-enabled user interface device. The device includes a network interface configured for sending and receiving data to a destination according to an open protocol network, a presence resource, and a communications resource. The presence resource is configured for establishing and maintaining presence information for a user of the device. The presence resource also is configured for retrieving presence information for an identified destination subscriber via the open protocol network. The communications resource is configured for providing selected communications services for the user based on the retrieved presence information, and is configured for establishing, as one of the selected communications services, a voice call to the destination based on the retrieved presence information specifying an available status of the identified destination subscriber at the destination for the voice call.

The integration of presence information for the user of the device and/or an identified destination subscriber with communications services enables the device to provide selected services based on the appropriate presence information. For example, the user can readily determine from the retrieved presence information if the identified destination subscriber is busy on an existing VoIP telephone call or a do-not-disturb mode, without having dialed the identified destination subscriber; in such a case, the user can use the device to send an instant (i.e., "pop-up") message to the identified destination subscriber without the necessity of a centralized instant messaging server. Use of presence information also can be used for dynamic call routing, where a VoIP call is routed to a different device based on the identified destination subscriber having registered with that different device.

Hence, integration of presence information with the user device enables substantially new services and features to be provided to the user that heretofore had not been considered possible in a device configured as a VoIP endpoint.

Another aspect of the present invention provides a method in a network-enabled user interface device. The method includes establishing and maintaining a connection to an open protocol network, and executing a presence resource, configured for establishing and maintaining presence information for a user of the device and retrieving presence information for an identified destination subscriber via the open protocol network, for registration and maintenance of presence information for a user of the device. The method also includes providing, by a communications resource, selected communications services for the user via the open protocol network and based on the retrieved presence information for the identified destination subscriber and the presence information for the user.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
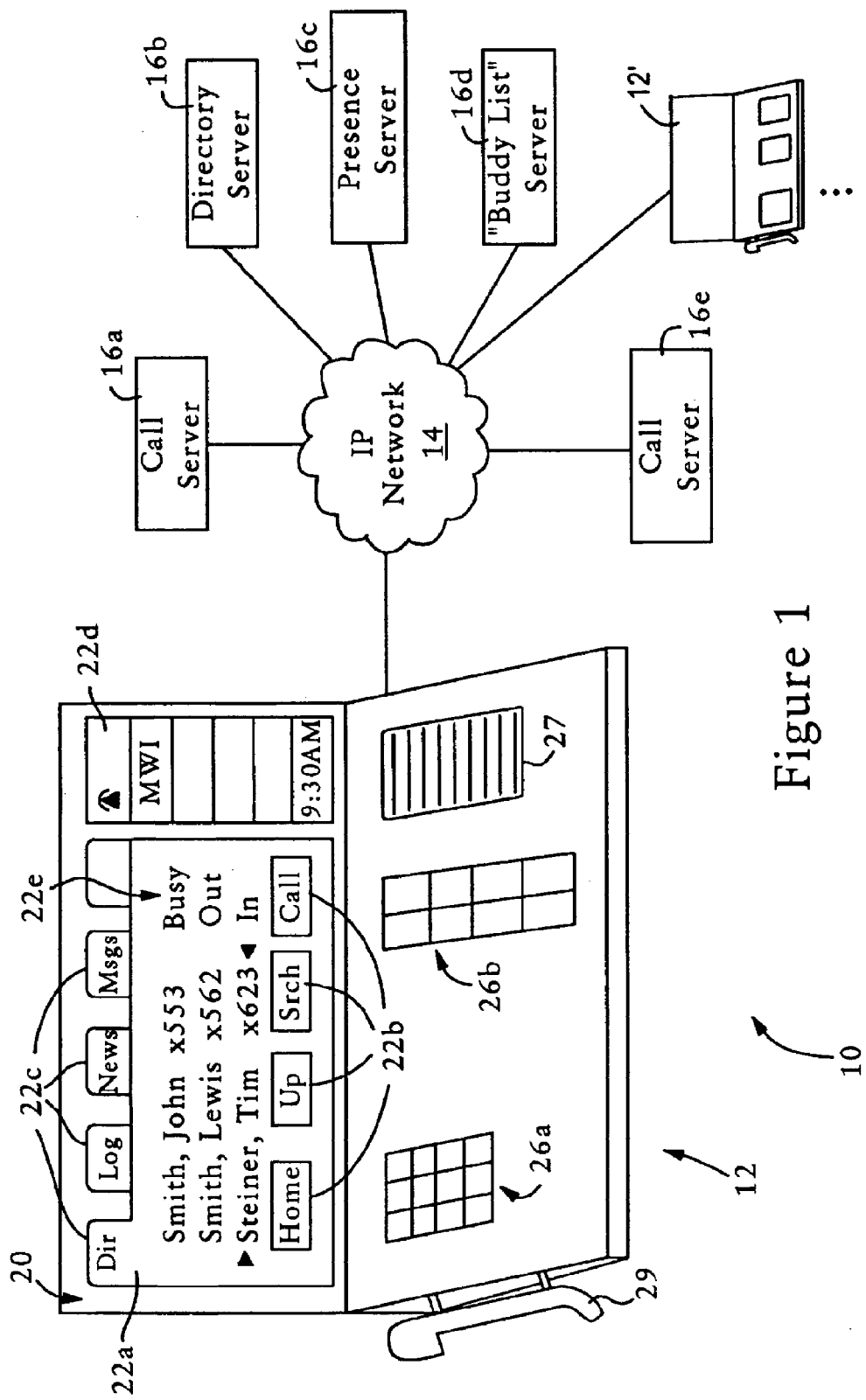
FIG. 1 is a block diagram illustrating a system for providing presence-based applications to a network-enabled user interface device, for example a Voice over IP telephone device, according to an embodiment of the present invention.

FIG. 1 is a block diagram illustrating a system 10 for providing presence-based application services to a network-enabled user interface device, for example a Voice over IP telephone device 12, according to an embodiment of the present invention. As shown in FIG. 1, the Voice over IP telephone device 12 is configured for communications by the IP network 14 with various servers 16 and other Voice over IP telephone devices 12' via the IP network 14. For example, the call servers 16a and 16e are configured for executing Voice over IP call processing applications according to a prescribed Voice over IP protocol, for example Media Gateway Control Protocol (MGCP) (RFC 2705), Session Initiation Protocol (SIP) (RFC 2543), H.323 protocol, etc. The corporate directory server 16b is configured for providing, for example, corporate telephone directory lists or e-mail address lists, enabling a user of the Voice over IP device 12 to enter search queries based on name, location, reverse number search, etc. to identify the desired entry in the directory. The system 10 also includes a presence server 16c, and a user-defined destination subscriber table (i.e., "buddy list") server 16d. The buddy list server 16d is configured for storing user-defined tables (i.e., lists) of destination subscribers for prescribed communications services, for example speed dialing, instant messaging, automatic address book entry for e-mail messages, etc.

The presence server 16c is configured for storing presence information received from the VoIP telephone devices 12, and supplying the presence information for identified users in response to queries. Note, however, that the operations described herein for the presence server 16c also may be performed by the individual VoIP devices 12, assuming the devices 12 are configured for exchanging presence information amongst each other.

The presence-based services provided by the VoIP telephone device 12, described below, are based on presence information specifying whether a user is determined to have a prescribed presence at a prescribed destination on the IP network 14. The term "presence" refers to a user's attributes relative to accessibility at an identified destination configured as an endpoint on the IP network (e.g., having an IP address). Hence, the presence information for a user specifies the attributes that describe the nature in which the user is available (i.e., reachable) at the specified device. For example, a user may be registered with the VoIP telephone device 12 by logging into the device 12 (or utilizing automatic presence detection means, such as active badges) to specify that he or she is available at the specified VoIP telephone device 12 to accept incoming telephone calls; once the presence information is established to identify the user relative to the device, certain attributes related to the device 12 may affect the presence information. For example, presence information including device attributes may specify the availability of the device to accept multiple calls, indicating whether the user can accept a second incoming voice call if the user already has an existing voice call. Assuming the VoIP telephone device 12 also is capable of sending and receiving e-mail type messages or "pop-up" messages (i.e., instant messages that are immediately displayed upon receipt), the device attributes may enable the presence information to specify that the user can receive voice calls, e-mail messages, and instant messages.

Hence, the presence information specifies attributes enabling the selection of services for a user as a client (i.e., initiating a service), or as a recipient (i.e., receiving a service such as an incoming call, incoming instant message, incoming voice-mail message, incoming e-mail message, etc.). Consequently, a user of the device 12 client can select available communications services for reaching an identified destination subscriber at the corresponding destination device 12' based on the presence information for the identified destination subscriber relative to the destination device 12'.

Figures 2A, 2B:
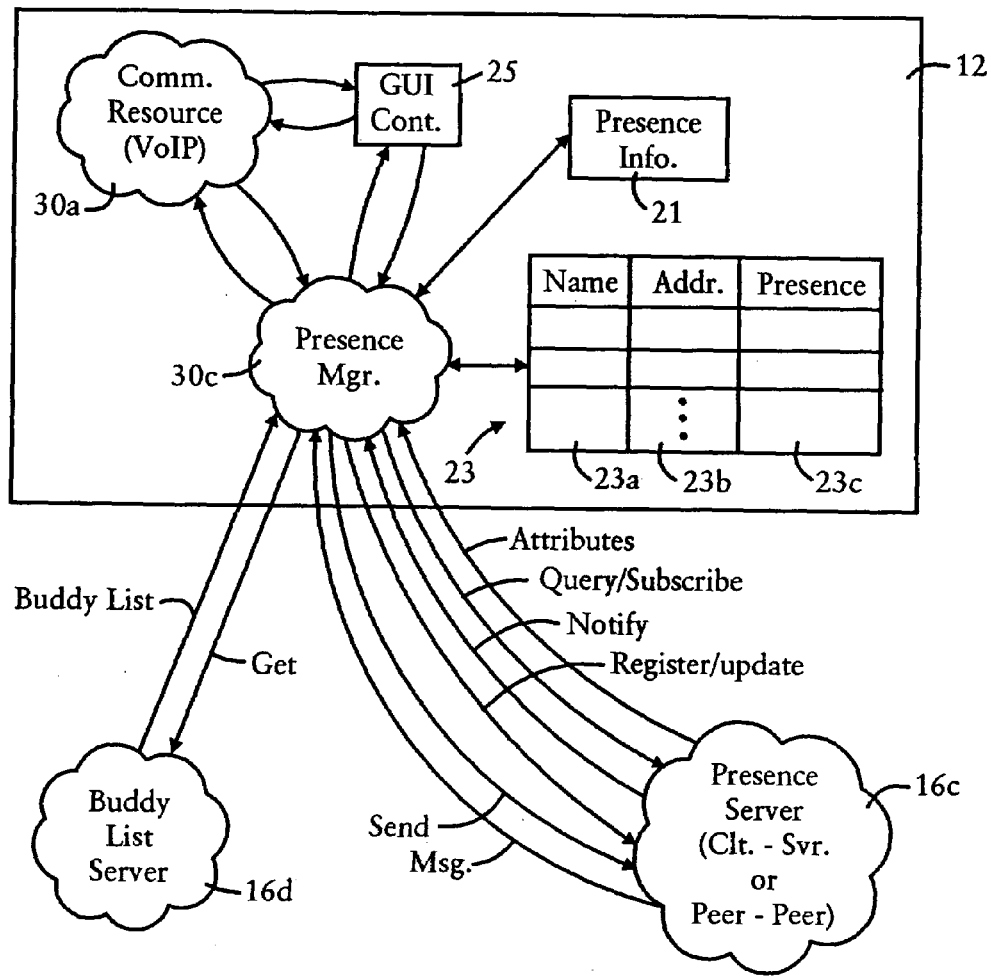
FIGS. 2A and 2B are diagrams illustrating interactions between the presence resources within the Voice over IP telephony devices and the communications servers on the IP network of FIG. 1, and exemplary presence attributes stored in an IP telephony device, respectively.

FIGS. 2A and 2B are diagrams illustrating in further detail the use of presence information to provide presence based services to a user of the VoIP telephony device 12. In particular, FIG. 2A illustrates that the VoIP telephone device 12 includes a graphic user interface (GUI) controller 25, and executable resources 30 including a communications resource 30a and a presence manager 30c. The communications resource 30a, illustrated as a VoIP resource, is configured for providing selective communication services for the user based on retrieved presence information; hence the communications resource 30a may provide to the user telephony based VoIP services, e-mail services, instant messaging (i.e., "pop-up" message) services, paging services, etc. based on the determined presence information for an identified destination subscriber. The GUI controller 25 is configured for providing application-based GUI operations enabling a user to identify presence state information for the identified destination subscriber, as well as identify and select available communication services for the identified destination subscriber. As described in further detail below, the presence manager 30c may provide to the GUI controller 25 a buddy list that specifies a prescribed list of destination subscribers and their respective presence state (e.g., available, unavailable, busy on telephone, do not disturb, text messages only etc.).

The presence manager 30c is configured for establishing and maintaining presence information for the user of the device, and retrieving presence information for destination subscribers via the IP network 14. In particular, the VoIP telephone device 12 includes a presence information table 21 configured for storing the presence information for the user of the device 12, and a destination subscriber table 23 configured for storing the presence information retrieved for prescribed destination subscribers, for example the subscribers specified by the user for a buddy list. For example, the destination subscriber table includes, for each entry, a name field 23a specifying an alias or nickname for the corresponding destination subscriber, and an IP address 23b specifying the destination IP address for the corresponding preferred device to which the destination subscriber is registered as present. Each entry of the destination subscriber table 23 also includes a presence state field 23c that specifies the presence information for the corresponding destination subscriber as retrieved by the presence manager 30c.

The presence manager 30c also establishes and maintains the presence information for the user of the device in the presence information table 21, illustrated in detail in FIG. 2B. As illustrated in FIG. 2B, the presence manager 30c may maintain various device attributes and user-specific attributes that are used to specify the services that may be available to the user as a client (e.g., initiating a telephone call, sending a message, etc.) or a server (e.g., receiving a telephone call, receiving a message, etc.).

For example, the presence manager 30c may store device attributes such as: device status (e.g., on hook, off hook, idle, operable, etc.); device connection status specifying connection status to the IP network 14; device location (e.g., physical location); and other user devices that may be accessible if the current device 12 is unavailable (e.g., for a single number reach applications). Personal user attributes specified within the presence information table 21 may include user name, as well as other personal information such as user's telephone number, employee identification number, etc. The presence information may also include: user activity duration, for example the amount of minutes spent on an existing phone call; duration of idle time of the device relative to user inactivity, for example if the device has not been in use for a measured time interval; prescribed user defined status phrase, for example out to lunch, client visit, business meeting, etc. The presence information 21 also may specify messages waiting for retrieval on another service, enabling the user to locally identify message awaiting retrieval.

The presence manager 30c is configured for establishing the presence information for the user of the device upon user login, which may be a manual procedure or an automatic procedure based on automatic location detection technology. Once the presence information is established and maintained within the presence information table 21, the presence manager 30c registers the presence information to an identified destination such as the presence server 16c. The presence server 16c, as illustrated in FIG. 1 and FIG. 2A, is configured for storing the presence information for all subscribers on the IP network 14, serving as a repository enabling other IP devices to query the presence server 16 for current presence information for identified destination subscribers. Hence, the presence manager 30c may determine the presence information for a destination subscriber by generating a query to the presence server 16c.

In addition, the presence server 16c may be configured to notify the presence manager 30c upon the change of presence state for an identified destination subscriber once that destination subscriber has updated the presence server 16c. Hence, the presence manager 30c registers the corresponding user in the presence server 16c by sending the information from the presence information table 21 to the presence server 16c; similarly the presence manager 30c updates the destination subscriber table 23 based on sending a query to the presence server 16c for retrieval of the attributes of the destination subscribers identified by the user, for example from the buddy list. Depending on implementation, other features may be configured within the presence server 16c, such as the ability to receive messages sent by the device 12 (e.g., pop-up messages or e-mail messages), and forward similar type messages to the presence manager 30c. The presence manager 30c also is configured for retrieving, upon registration by the user with the VoIP telephony device 12, the buddy list from the buddy list server 16d, for example by sending a list request that specifies the user name to the buddy list server 16d; the buddy list server 16d, in response to receiving the list requests specifying the user, sends the list of names 23a and the associated IP addresses 23b (and optionally the presence state information 23c) to the presence manager 30c.

As apparent from the foregoing, numerous variations may be made with respect to the transfer of presence information by the presence manager 30c via the IP network 14. For example, use of a presence server 16 may be eliminated if the presence manager 30c retains the name information 23a and address information 23b; in such case, the presence manager 30c may send a request directly to the identified IP destination device for the presence information for the corresponding destination subscriber, eliminating the necessity of the presence server 16c. Similarly, the list of destination subscribers may be permanently stored within the destination subscriber table, eliminating the necessity of the buddy list server 16d. Such variations illustrate the flexibility in implementing the features of integrating presence information with an Internet Protocol based end point to provide presence based communication services over an IP network.

Hence, presence based communication services can be provided via an IP network 14 by establishing and maintaining presence information for a user of the device using the presence manager 30c, and by retrieving the presence information for identified destination subscribers via the IP network. Hence, subscribers to the IP network can select the appropriate communication services based on the corresponding presence information for an identified destination subscriber. In addition, advanced operations such as dynamic call routing can be performed by the IP telephony device 12 initiating the telephone call based on the presence information, reducing the necessity for call forwarding operations by the call servers 16a or 16e.

Additional features of the presence based communication services will become more readily apparent upon the following detailed description of the VoIP telephony device, and the illustrated presence based communication operations.

Figure 3:
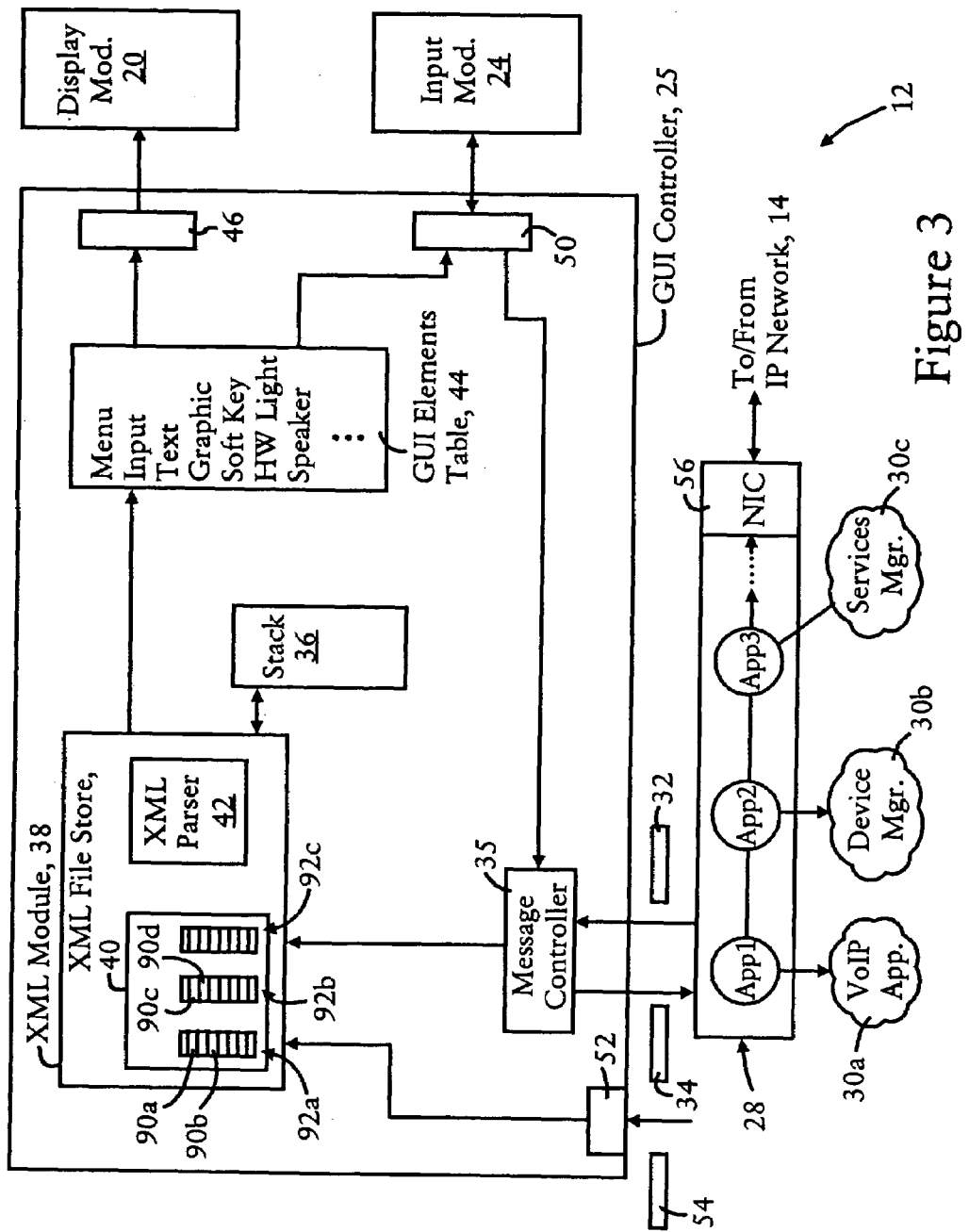
FIG. 3 is a diagram illustrating in detail the Voice over IP telephone device of FIG. 1 according to an embodiment of the present invention.

FIG. 3 is a block diagram illustrating in detail the Voice over IP telephone device 12 according to the embodiment of the present invention. The Voice over IP telephone device 12 includes a display screen 20 configured for displaying display elements 22, illustrated in FIG. 1. For example, the display screen 20 may display an application window 22a having soft key buttons 22b for window-specific user input options. Additional display elements may be implemented as tab keys 22c that identify additional application services that may be selected by a user, where a user selects the corresponding application by pressing the corresponding tab 22c. Additional display elements may be implemented as telephone device elements 22d that may indicate device-specific state information, any one of which may be used to provide a hierarchical menu list based on pressing the corresponding soft key input. Additional display elements may include status icons 22e configured for identifying presence state information for the corresponding directory entry.

The Voice over IP telephone device 12 also includes a user input interface 24 configured for detecting user inputs to soft key elements (e.g., 22b, 22c, 22d or 22e) or hard key elements 26, illustrated in FIG. 1 as a twelve button keypad 26a, and function keys 26b. Hence, the user input interface 24, illustrated in FIG. 2, is configured for enabling the soft keys and the hard keys 26 based on application-based commands, and supplying user inputs for processing by the appropriate executable applications, described below. The Voice over IP telephone device 12 also includes audio driver circuitry (not shown) for playing audio files to an external speaker 27 distinct from the telephone handset 29.

The Voice over IP telephone device 12 also includes a graphic user interface (GUI) controller 25, and an application controller 28. The Voice over IP telephone device 12 also includes locally executable applications 30, for example a communication resource 30a including a VoIP application configured for initiating and receiving Voice over IP based telephone calls between the call server 16a according to Voice over IP protocol, for example, Media Gateway Control Protocol (MGCP) (RFC 2705), Session Initiation Protocol (SIP) (RFC 2543), H.323 protocol, etc. Other examples of locally executable applications include a device manager 30b configured for managing local operation of the Voice over IP telephone device 12.

The GUI controller 25 is configured for receiving application-based commands (i.e., "requests") 32 from the application controller 28 that specify an application state (specified by an XML document 90) to be performed. For example, each application-based command 32 is received by the GUI controller 25 in the form of a text-based message, and specifies at least one of a display operation that specifies display parameters for a display element 22, an input operation specifying an input operation for a soft key or a hard key by the user input interface 24, and/or response logic enabling the GUI controller 25 to determine how to respond to a prescribed user input supplied by the user input interface 24.

The GUI controller 25 also is configured for outputting application-based responses (i.e., "posts") 34 based on the supplied user inputs from the user input interface 24 and based on the application-based commands that specify the manner in which the posts 34 should be generated. Hence, each application, executed locally (e.g., application 30) or remotely (e.g., a server 16), operate according to a request/response system, enabling deployment of arbitrary application within the Voice over IP telephone device 12 based on standardized messaging protocols, described below.

The Voice over IP telephone device 12 implements application-specific messaging using extensible markup language (XML) documents 90, referred to as "application state documents", that are used to define the generic messaging protocol (i.e., command set) available to executable applications. In particular, the GUI controller 25 includes a stack 36, and an XML module 38. The XML module 38 includes an XML file store 40 for storing XML documents 90, and an XML parser 42 for parsing a selected XML document. Each XML document 90 corresponds to a specified state of an executable application (hence the term "application state document"), and may reference another XML document. Each XML document 90 includes XML tags that specify an operation to be performed: for example, XML tags can specify the manner in which display elements 20 are to be displayed, how input operations are to be performed by the user input interface 24, how inputs supplied by a user should be interpreted, how audio files should be played, etc.

Each XML document (e.g., 90a) specifies a prescribed application state, and may reference another XML document (e.g., 90b) that specifies another corresponding application state for the same executable application. Hence, the XML application state documents 90 are grouped into XML applications 92, where a group of application state documents 90 collectively define the XML-based application to be performed. Hence, the XML application state documents 90 are stored within an XML file store 40 in groups of XML applications 92a, 92b, and 92c. For example, the XML documents 90a and 90b specify respective states of the XML application 92a, and the XML documents 90c and 90d specify respective states of the XML application 92b.

The XML documents for a prescribed application typically are loaded in the XML file store 40 as default documents; alternately, newer application-specific XML documents 92 may be loaded into the XML file store 40 during registration of a new application service. The stack 36 is configured for storing active XML documents used by the GUI controller 25 for active applications. The XML parser 42 is configured for generating display element identifiers specifying display elements to be displayed (i.e., display operations), input identifiers that specify the input operations to be performed by the user input interface 24, and any other identifiers specified during the selected XML document based on the application-specific commands 32 (e.g., video or audio operations).

In particular, the graphic user interface (GUI) controller 35 is configured for parsing the text strings 32 and recovering the application specific commands (e.g., the XML document identifiers), and forwarding the application-specific commands to the XML module 38. For example, the application specific command may specify the XML document 90 to be retrieved from the XML file store 40 and parsed to determine the interface elements to be applied. The XML parser 42, upon parsing the selected XML document, outputs the identifiers specified in the parsed XML document to a GUI elements table 44.

The GUI elements table 44 is configured for storing available interface elements, for example menu elements, input elements, text elements, graphic elements, soft key elements, hardware light elements, speaker elements, etc. Each GUI element specifies instructions and parameters that enable the generation of the corresponding interface operation. The GUI elements table 44 outputs the selected elements to a display abstraction interface 46 and/or an input abstraction interface 50, or the speaker 27 as appropriate. The display abstraction interface 46 is configured for generating display-specific images for display of the respective display elements by the display screen 20, and the input abstraction interface 50 is configured for generating hardware-specific commands for configuration of the user input interface for the respective selected input operations.

Hence, the local and remotely executed applications control the user interface of the Voice over IP telephone device 12 by sending text-based messages to the GUI controller 25; the text-based messages are used to identify an XML document 90, stored in the XML file store 40, to be parsed for identification of display elements and selected input operations to be provided to the display screen 20 and the user input interface 24, respectively. Specific data defining the display element and the input operations are retrieved from the GUI element table 44 and forwarded to the appropriate hardware abstraction interface 46 or 50. The hardware abstraction interfaces convert the supplied GUI elements to hardware-specific instructions to cause the display screen 20 and the user input interface 24 to provide the appropriate interface elements.

The GUI controller 25 also include a messaging interface 52 configured for receiving event messages 54, composed of text-based messaging. In particular, the event messages are time-oriented messages that specify the occurrence of prescribed events, for example a one second timer for updating the time display element, or other time-oriented messages occurring independently of local or remote application states, for example pop-up messages. The event messages may be sent either to the XML module 38 for parsing a prescribed XML document 90 (e.g., for playing an audio or video announcement), or to the GUI elements table 44 for generation of a display element including the supplied text. Additional details related to the XML base control of the GUI controller 25 are disclosed in commonly assigned, copending application Ser. No. 09/883,211, filed Jun. 19, 2001, entitled ARRANGEMENT FOR DELIVERING APPLICATIONS TO A NETWORK ENABLED TELEPHONY DEVICE, the disclosure of which is incorporated in its entirety herein by reference.

Figure 4A:
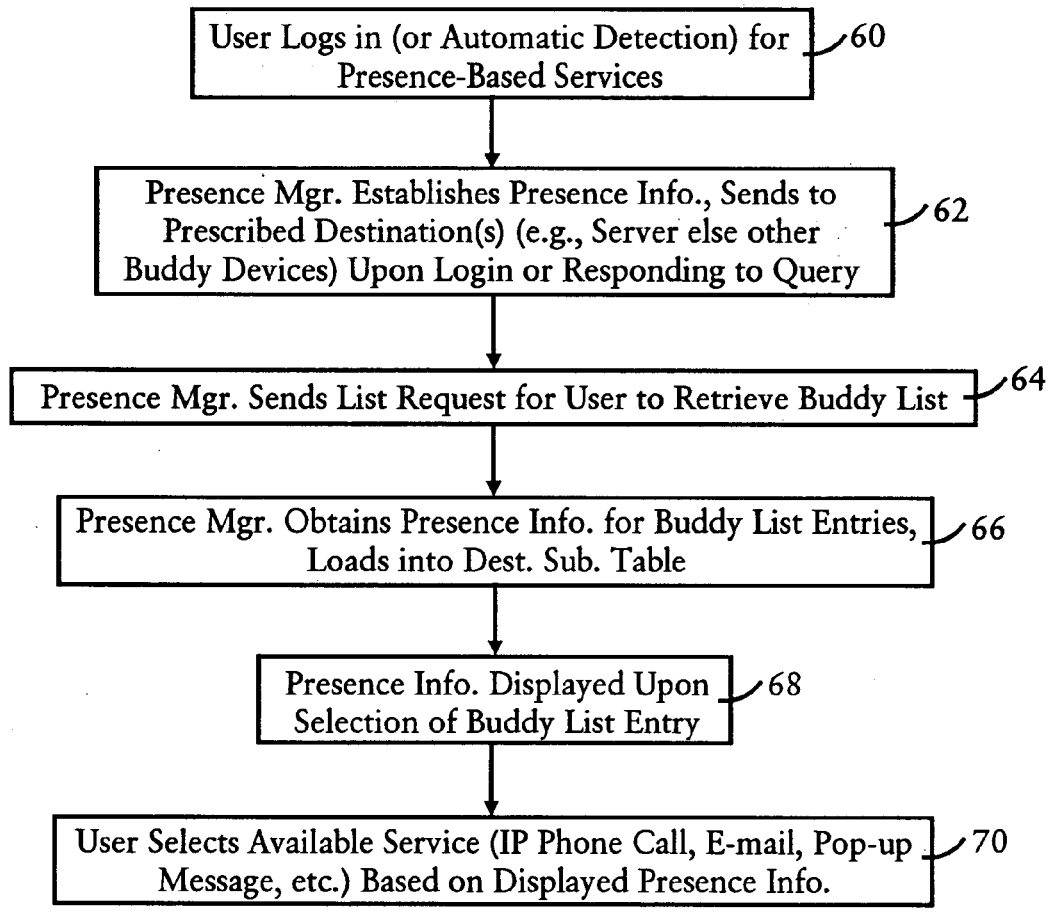
FIGS. 4A and 4B are diagrams illustrating a method of providing presence-based applications to a user of the Voice over IP telephone device, according to an embodiment of the present invention.
Figure 4B:
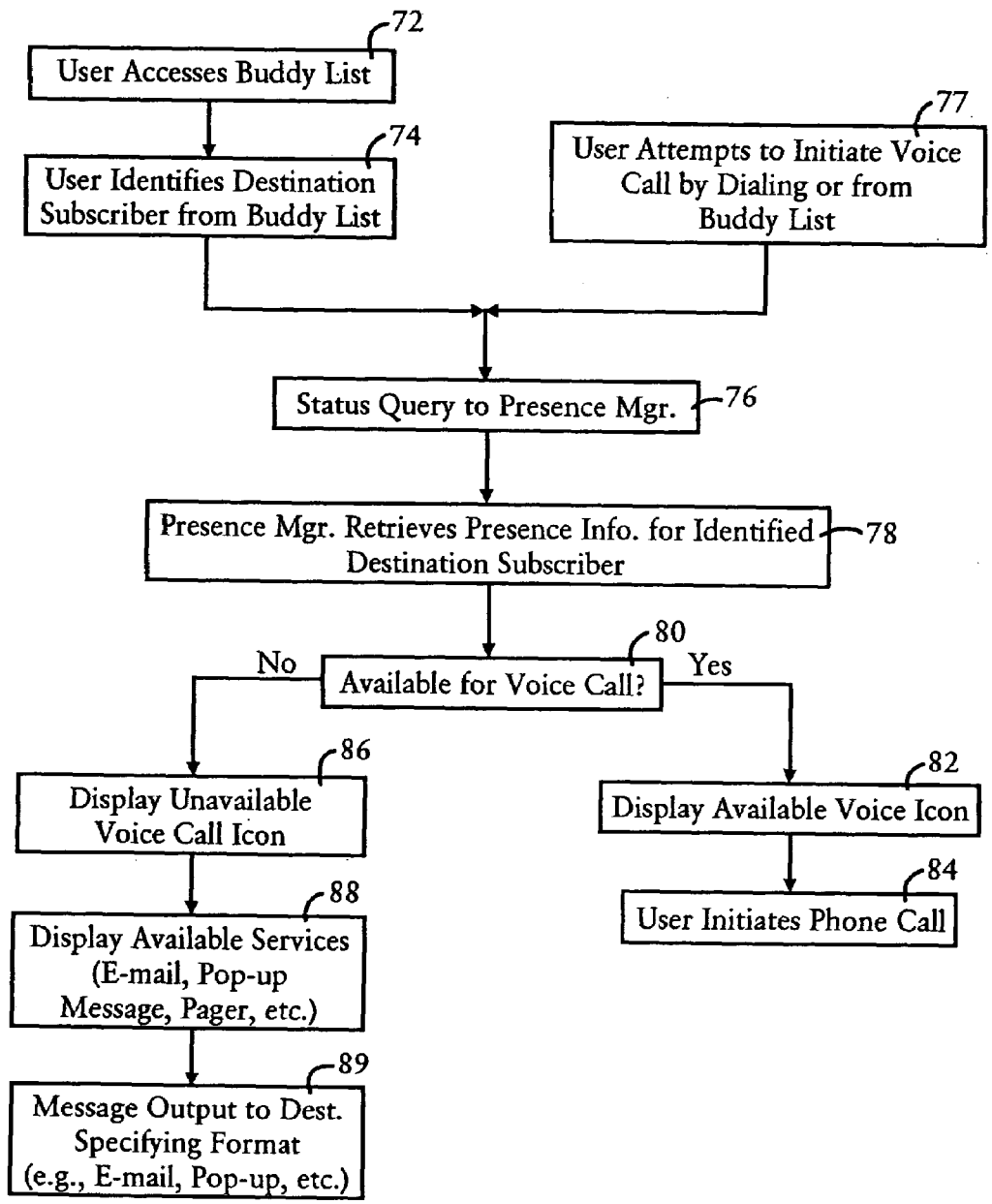

FIGS. 4A and 4B are diagrams illustrating the method of providing presence based application services to a user of the VoIP telephone device 12 according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disk, etc.).

The method begins in step 60, where the user logs in to the VoIP telephony device 12, for example by entering a user name and password, or alternately by the above-described presence detection systems, in order to receive presence based services. The presence manager 30c, in response to the user registration, establishes the presence information within the presence information table 21, and sends to a prescribed destination the presence information in step 62. For example, the presence manager 30c may send the presence information 21 in response to subscriber login, although the presence manager 30c may also send the presence information 21 in response to a query received from the IP network 14, for example, from another IP device 12'. In addition, the presence manager may send the presence information 21 to the presence server 16c if the presence information is managed centrally within the IP network 14, or alternately to prescribed destinations (e.g., the IP devices for the destination subscribers specified in the destination subscriber table 23) if the presence information is distributed throughout the IP network 14 without the use of the presence server 16c. If necessary, the presence manager 30c also sends a list request in step 64, specifying the user, to the buddy list server 16d in order to retrieve the buddy list in step 64. Assuming deployment of the buddy list server 16d, the buddy list 16d, in response to receiving the list request specifying the user identifier, sends the corresponding buddy list to the presence manager 30c for storage or updating of the destination subscriber table 23. The presence manager 30c also obtains the presence information in step 66 for the buddy list entries and the destination subscriber table 23, for example by issuing a query to the presence server 16c or issuing requests to the respective IP devices serving the respective destination subscribers. The presence manager 30c, in response to receiving the requested presence information related to the respective destination subscribers, loads the retrieve presence information into the destination subscriber table 23.

Once the presence information within the presence information table 21 has been disseminated to the appropriate consumers (e.g., the presence server 16c or any IP devices 12' to which the user is identified as a destination subscriber) and the destination subscriber table 23 has been populated, the user is able to enjoy presence based services. For example, the presence manager 30c is configured for presenting to the GUI controller 25 the displayed presence information 22e upon selection of a buddy list entry, as illustrated in FIG. 1. Hence, a user can automatically determine in step 68 a state of a destination based on the corresponding presence information displayed with the destination subscriber identity. The user can then select in step 70 the appropriate available service (e.g., IP phone call, e-mail, pop-up message, etc.), based on the displayed presence information 22e. For example, if the display indicates that the identified destination subscriber is "in" the user can initiate a VoIP telephone call; however if the identified destination subscriber is identified as "busy" on a telephone call, the user may be unable to initiate a VoIP telephone call, but can send an e-mail message or an instant pop-up message notifying the busy destination user of an important event that demands immediate attention. Similarly, if the presence information indicates that the identified destination subscriber is "out" (i.e., not logged in), the user may access single number reach services in order to locate the identified destination subscriber.

FIG. 4B is a diagram further illustrating operations that are available to the user based on presence based services. In particular, the user may access the presence based services by first accessing his or her buddy list in step 72, and identifying a destination subscriber from the buddy list in step 74. Typically the presence manager 30c is configured for automatically outputting updated presence information in response to state changes in either the device attributes or the subscriber attributes; however, a user still may be given the feature of specifically requested updated presence information. In such a case, the user may request the communication resource to generate a status query in step 76 to the presence manager 30a. Alternately, a status query may be initiated automatically by the user attempting in step 77 to initiate a voice call by directly dialing a destination subscriber identified from the destination subscriber table 23. In such a case, the communications resource 30a may wish confirmation of the availability of the identified destination subscriber before initiating the VoIP telephone call.

The presence manager 30c in response to receiving the status query in step 76, sends a request to either presence server 16c or the IP telephony device 12' serving the identified destination subscriber. The presence manager 30c in response to the retrieving the presence information for the identified destination subscriber in step 78, sends a status reply to the communications resource 38 indicating in step 80 whether the identified destination subscriber is available for a voice call. If in step 80 the identified destination subscriber is available, the communications resource 30a sends a command to the GUI controller 25 to display the available voice icon in step 82, enabling the user to initiate in step 84 the phone call. However if the identified destination subscriber is unavailable, the communications resource 30a sends a request to the GUI controller 25 to display an unavailable voice call icon in step 86, and to display in step 88 alternative services, for example e-mail, pop-up message, pager, etc. The user, in response to selecting an alternative service, for example, an e-mail service or instant messaging service, causes the communications resource 30a to output in step 89 a message to the destination 12' that specifies the messaging format (e.g., e-mail, pop-up message, etc.), enabling the destination device 12' to display the received message in the appropriate manner. Note, however, that the destination device 12' may be configured by the corresponding destination subscriber to queue incoming pop-up messages in a message-waiting box, for example to prevent distracting pop-up messages from being displayed while the destination subscriber is working; if desired, such redirection of the pop-up message to a message-waiting box may be identified within the destination subscriber's presence information, enabling the user of device 12 to recognize that the message will not be immediately displayed.

According to the disclosed embodiment, presence based services are integrated into an IP based endpoint user device, for example a VoIP telephony device enabling a user to enjoy selected presence based communication services based on the presence status of the user of the device and the presence status of identified destination subscribers. Hence, enhanced services may be provided to users of IP based devices that are more personal in nature enhancing the user interaction with the IP based endpoint devices.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A network-enabled user interface device, the device including:

a network interface configured for sending and receiving data to and from a destination device via an open protocol network;

a presence resource configured for establishing and maintaining presence information for a user of the device, and retrieving presence information for an identified destination subscriber via the open protocol network, the retrieved presence information identifying an availability of the identified destination subscriber and the destination device for receiving at least one identified communications service via the destination device; and a communications resource configured for providing selected communications services for the user based on the retrieved presence information, the communications resource configured for selectively initiating, as one of the selected communications services, a voice call between the device and the destination device based on the retrieved presence information specifying an available status of the identified destination subscriber and the destination device for reception of the voice call via the destination device;

wherein the presence resource is configured for retrieving the presence information, from a presence server on the open protocol network or the destination device, in response to a status query for the identified destination subscriber initiated based on a user input.

2. The device of claim 1, wherein the communications resource is configured for displaying an unavailable voice call indicator based on the retrieved presence information specifying an unavailable status of the identified destination subscriber at the destination device for the voice call.

3. The device of claim 1, wherein the status query is initiated by the communications resource in response to the user attempting to initiate the voice call.

4. The device of claim 1, further comprising a destination subscriber table configured for storing user-selectable destination subscriber entries, each entry configured for storing a corresponding destination subscriber name, a corresponding destination subscriber address specifying an address for a corresponding device on the open protocol network, and corresponding retrieved presence information relative to the corresponding device, the status inquiry initiated based on the user input selecting one of the destination subscriber entries as the identified destination subscriber.

5. The device of claim 4, wherein the network interface is configured for retrieving the destination subscriber table by sending a list request, specifying the user, to a server configured for storing destination subscriber tables for respective users.

6. The device of claim 4, wherein the communication resource is configured for outputting, as a second of the selected communications services, a text-based message input by the user for pop-up display at the destination device based on the retrieved presence information specifying an available status of the identified destination subscriber at the destination device for reception of the text-based message, the communication resource configured for prompting the user to utilize the second selected communications service based on the retrieved presence information specifying an unavailable status of the identified destination subscriber at the destination device for reception of the voice call.

7. The device of claim 6, further comprising a user interface configured for selectively displaying a second text-based message, received from the open protocol network, as one of a pop-up message or a selected message displayed based on user selection, based on a corresponding message attribute within the second text-based message.

8. The device of claim 1, wherein the presence resource is configured for supplying the presence information to a second device via the open protocol network.

9. The device of claim 8, wherein the presence resource is configured for supplying the presence information to the second device in response to a query received from the second device.

10. The device of claim 8, wherein the presence resource is configured for supplying the presence information to the second device in response to a determined change in the presence information based on the user changing a state with one of the selected communications services with the second device.

11. The device of claim 1, wherein the network interface is configured for maintaining a continuous connection on the open protocol network.

12. The device of claim 1, wherein the presence information includes at least one of status of the device, connectivity status for the network interface, personal user information, current user activity, duration of the current user activity, duration of idle time of the device relative to user inactivity, prescribed user-defined status phrases, device location, identification of secondary devices in use by the user, or messages waiting for retrieval on another service.

13. The device of claim 1, wherein the communications resource is configured for providing the selected communications services based on respective registration operations with prescribed servers via the open protocol network, the communications resource configured for outputting selected portions of the presence information to the prescribed servers for the respective selected communications services.

14. A method in a network-enabled user interface device, the method comprising:

establishing and maintaining a connection to an open protocol network;

executing a presence resource, configured for establishing and maintaining presence information for a user of the device and retrieving presence information for an identified destination subscriber via the open protocol network, for registration and maintenance of presence information for a user of the device, the retrieved presence information identifying an availability of the identified destination subscriber and a destination device for receiving at least one identified communications service via the destination device connected to the open protocol network; and providing, by a communications resource, selected communications services for the user via the open protocol network and based on the retrieved presence information for the identified destination subscriber and the presence information for the user, including selectively initiating, as one of the selected communications services, a voice call between the device and the destination device based on the retrieved presence information specifying an available status of the identified destination subscriber and the destination device for reception of the voice call via the destination device;

wherein the executing includes retrieving by the presence resource the presence information, from a presence server on the open protocol network or the destination device in response to a status query for the identified destination subscriber initiated based on a user input.

15. The method of claim 14, further comprising displaying an unavailable voice call indicator based on the retrieved presence information specifying an unavailable status of the identified destination subscriber to receive a voice call at the destination device.

16. The method of claim 15, wherein the providing further includes initiating the status query by the communications resource in response to the user attempting to initiate the voice call.

17. The method of claim 15, wherein the device includes a destination subscriber table configured for storing user-selectable destination subscriber entries, each entry configured for storing a corresponding destination subscriber name, a corresponding destination subscriber address specifying an address for a corresponding device on the open protocol network, and corresponding retrieved presence information relative to the corresponding device, wherein the providing includes initiating the status inquiry based on the user input selecting one of the destination subscriber entries as the identified destination subscriber for a selected service.

18. The method of claim 17, further comprising sending a list request, specifying the user, to a server configured for storing destination subscriber tables for respective users, for retrieval of the destination subscriber table.

19. The method of claim 17, wherein the providing further includes outputting, as a second of the selected communications services, a text-based message input by the user for pop-up display at the destination device based on the retrieved presence information specifying an available status of the identified destination subscriber at the destination device for reception of the text-based message, the providing including prompting the user to utilize the second selected communications service based on the retrieved presence information specifying an unavailable status of the identified destination subscriber at the destination device for reception of the voice call.

20. The method of claim 19, wherein the providing further includes displaying a second text-based message received from the open protocol network.

21. The method of claim 14, wherein the executing includes supplying the presence information to a second device via the open protocol network.

22. The method of claim 21, wherein the supplying includes providing the presence information to the second device in response to a query received from the second device.

23. The method of claim 21, wherein supplying includes providing the presence information to the second device in response to a determined change in the presence information based on the user changing a state with one of the selected communications services with the second device.

24. The method of claim 14, wherein the establishing and maintaining includes maintaining a continuous connection on the open protocol network.

25. The method of claim 14, wherein the executing includes maintaining, as the presence information, at least one of status of the device, connectivity status for the network interface, personal user information, current user activity, duration of the current user activity, duration of idle time of the device relative to user inactivity, prescribed user-defined status phrases, device location, identification of secondary devices in use by the user, or messages waiting for retrieval on another service.

26. The method of claim 14, wherein the providing includes outputting selected portions of the presence information to prescribed servers configured for initiating the respective selected communications services.

27. A computer readable medium having stored thereon sequences of instructions for providing selected communications services in a network-enabled user interface device, the sequences of instructions including instructions for performing the steps of:

establishing and maintaining a connection to an open protocol network;

executing a presence resource, configured for establishing and maintaining presence information for a user of the device and retrieving presence information for an identified destination subscriber via the open protocol network, for registration and maintenance of presence information for a user of the device, the retrieved presence information identifying an availability of the identified destination subscriber and a destination device for receiving at least one identified communications service via the destination device connected to the open protocol network; and providing, by a communications resource, selected communications services for the user via the open protocol network and based on the retrieved presence information for the identified destination subscriber and the presence information for the user, including selectively initiating, as one of the selected communications services, a voice call between the device and the destination device based on the retrieved presence information specifying an available status of the identified destination subscriber and the destination device for reception of the voice call via the destination device;

wherein the executing includes retrieving by the presence resource the presence information, from a presence server on the open protocol network or the destination device, in response to a status query for the identified destination subscriber initiated based on a user input.

28. The medium of claim 27, further comprising instructions for displaying an unavailable voice call indicator based on the retrieved presence information specifying an unavailable status of the identified destination subscriber to receive a voice call at the destination device.

29. The medium of claim 28, wherein the providing step further includes initiating the status query by the communications resource in response to the user attempting to initiate the voice call.

30. The medium of claim 28, wherein the device includes a destination subscriber table configured for storing user-selectable destination subscriber entries, each entry configured for storing a corresponding destination subscriber name, a corresponding destination subscriber address specifying an address for a corresponding device on the open protocol network, and corresponding retrieved presence information relative to the corresponding device, wherein the providing step includes initiating the status inquiry based on the user input selecting one of the destination subscriber entries as the identified destination subscriber for a selected service.

31. The medium of claim 30, further comprising instructions for performing the step of sending a list request, specifying the user, to a server configured for storing destination subscriber tables for respective users, for retrieval of the destination subscriber table.

32. The medium of claim 30, wherein the providing step further includes outputting, as a second of the selected communications services, a text-based message input by the user for pop-up display at the destination device based on the retrieved presence information specifying an available status of the identified destination subscriber at the destination device for reception of the text-based message, the providing including prompting the user to utilize the second selected communications service based on the retrieved presence information specifying an unavailable status of the identified destination subscriber at the destination device for reception of the voice call.

33. The medium of claim 32, wherein the providing step further includes displaying a second text-based message received from the open protocol network.

34. The medium of claim 27, wherein the executing step includes supplying the presence information to a second device via the open protocol network.

35. The medium of claim 34, wherein the supplying step includes providing the presence information to the second device in response to a query received from the second device.

36. The medium of claim 34, wherein supplying step includes providing the presence information to the second device in response to a determined change in the presence information based on the user changing a state with one of the selected communications services with the second device.

37. The medium of claim 27, wherein the establishing and maintaining step includes maintaining a continuous connection on the open protocol network.

38. The medium of claim 27, wherein the executing step includes maintaining, as the presence information, at least one of status of the device, connectivity status for the network interface, personal user information, current user activity, duration of the current user activity, duration of idle time of the device relative to user inactivity, prescribed user-defined status phrases, device location, identification of secondary devices in use by the user, or messages waiting for retrieval on another service.

39. The medium of claim 27, wherein the providing step includes outputting selected portions of the presence information to prescribed servers configured for initiating the respective selected communications services.

40. A network-enabled user interface device comprising:
connection means for establishing and maintaining a connection to an open protocol network;
presence means for establishing and maintaining presence information for a user of the device and retrieving presence information for an identified destination subscriber via the open protocol network, for registration and maintenance of presence information for a user of the device, the retrieved presence information identifying an availability of the identified destination subscriber and a destination device for receiving at least one identified communications service via the destination device connected to the open protocol network; and
services means for providing selected communications services for the user via the open protocol network and based on the retrieved presence information for the identified destination subscriber and the presence information for the user, the services means configured for selectively initiating, as one of the selected communications services, a voice call between the device and the destination device based on the retrieved presence information specifying an available status of the identified destination subscriber and the destination device for reception of the voice call via the destination device;
wherein the presence means is configured for retrieving the presence information, from at least one of a presence server on the open protocol network or the destination device, in response to a status query for the identified destination subscriber initiated based on a user input.

41. The device of claim 40, further comprising means for displaying an unavailable voice call indicator based on the retrieved presence information specifying an unavailable status of the identified destination subscriber to receive a voice call at the destination device.

42. The device of claim 41, wherein the services means is configured for initiating the status query in response to the user attempting to initiate the voice call.

43. The device of claim 41, wherein the device further includes a destination subscriber table configured for storing user-selectable destination subscriber entries, each entry configured for storing a corresponding destination subscriber name, a corresponding destination subscriber address specifying an address for a corresponding device on the open protocol network, and corresponding retrieved presence information relative to the corresponding device, wherein the services means is configured for initiating the status inquiry based on the user input selecting one of the destination subscriber entries as the identified destination subscriber for a selected service.

44. The device of claim 43, wherein the connection means is configured for sending a list request, specifying the user, to a server configured for storing destination subscriber tables for respective users, for retrieval of the destination subscriber table.

45. The device of claim 43, wherein the services means is configured for outputting, as a second of the selected communications services, a text-based message input by the user for pop-up display at the destination device based on the retrieved presence information specifying an available status of the identified destination subscriber at the destination device for reception of the text-based message, the services means configured for prompting the user to utilize the second selected communications service based on the retrieved presence information specifying an unavailable status of the identified destination subscriber at the destination device for reception of the voice call.

46. The device of claim 45, wherein the services means is configured for providing for display a second text-based message received from the open protocol network.

47. The device of claim 40, wherein the presence means is configured for supplying the presence information to a second device via the open protocol network.

48. The device of claim 47, wherein the presence means is configured for providing the presence information to the second device in response to a query received from the second device.

49. The device of claim 47, wherein presence means is configured for providing the presence information to the second device in response to a determined change in the presence information based on the user changing a state with one of the selected communications services with the second device.

50. The device of claim 48, wherein the connection means is configured for maintaining a continuous connection on the open protocol network.

51. The device of claim 40, wherein the presence means is configured for maintaining, as the presence information, at least one of status of the device, connectivity status for the network interface, personal user information, current user activity, duration of the current user activity, duration of idle time of the device relative to user inactivity, prescribed user-defined status phrases, device location, identification of secondary devices in use by the user, or messages waiting for retrieval on another service.

52. The device of claim 40, wherein the services means is configured for outputting selected portions of the presence information to prescribed servers configured for initiating the respective selected communications services.

53. The device of claim 1, wherein:
the presence resource is configured for retrieving the presence information for the identified destination subscriber from the destination device via the open protocol network; and
the communications resource is configured for initiating the voice call with the destination device based on accessing a call server, distinct from the destination device, via the open protocol network.

54. The method of claim 14, wherein:
the executing includes retrieving, by the presence resource, the presence information for the identified destination subscriber from the destination device via the open protocol network; and
the selectively initiating including initiating the voice call with the destination device based on accessing a call server, distinct from the destination device, via the open protocol network.

55. The medium of claim 27, wherein:
the executing includes retrieving, by the presence resource, the presence information for the identified destination subscriber from the destination device via the open protocol network; and
the selectively initiating including initiating the voice call with the destination device based on accessing a call server, distinct from the destination device, via the open protocol network.

56. The device of claim 40, wherein:
the presence means is configured for retrieving the presence information for the identified destination subscriber from the destination device via the open protocol network; and
the services means is configured for initiating the voice call with the destination device based on accessing a call server, distinct from the destination device, via the open protocol network.

* * * * *

UNITED STATES PATENT AND TRADEMARK OFFICE
CERTIFICATE OF CORRECTION

PATENT NO. : 7,269,162 B1 Page 1 of 1
APPLICATION NO. : 09/908578
DATED : September 11, 2007
INVENTOR(S) : Bryan Turner It is certified that error appears in the above-identified patent and that said Letters Patent is hereby corrected as shown below:

Column 14, line 26, please insert a comma after the word "device".

Signed and Sealed this

Twenty-seventh Day of May, 2008

JON W. DUDAS
*Director of the United States Patent and Trademark Office*